United States Patent
Carter (10) Patent No.: US 11,209,577 B2
(45) Date of Patent: Dec. 28, 2021

(54) MACRO-SCALE FEATURES FOR OPTICALLY BLACK SURFACES AND STRAYLIGHT SUPPRESSION

(71) Applicant: Ocean Optics, Inc., Largo, FL (US)

(72) Inventor: James A. Carter, Indialantic, FL (US)

(73) Assignee: OCEAN OPTICS, INC., Largo, FL (US)

( * ) Notice: Subject to any disclaimer, the term of this patent is extended or adjusted under 35 U.S.C. 154(b) by 313 days.

(21) Appl. No.: 16/427,244

(22) Filed: May 30, 2019

(65) Prior Publication Data
US 2019/0369305 A1 Dec. 5, 2019

Related U.S. Application Data

(60) Provisional application No. 62/677,699, filed on May 30, 2018.

(51) Int. Cl.
| | | |
|---|---|---|
| G02B 5/04 | (2006.01) | |
| G02B 5/00 | (2006.01) | |
| G02B 1/118 | (2015.01) | |

(52) U.S. Cl.
CPC .............. *G02B 5/003* (2013.01); *G02B 1/118* (2013.01)

(58) Field of Classification Search
CPC .......... G02B 5/003; G02B 1/118; G02B 1/11; G02B 27/0018; G02B 5/0294; G02B 5/045; G02B 19/0042; G02B 1/14; G02B 1/16; G02B 2207/123; G02B 5/0231; G02B 5/04; G02F 1/133502; G03B 21/60
See application file for complete search history.

(56) References Cited

U.S. PATENT DOCUMENTS

| | | | | |
|---|---|---|---|---|
| 4,012,115 A | * | 3/1977 | Brown ................... | G03B 21/60 359/455 |
| 4,396,643 A | * | 8/1983 | Kuehn .................. | F24S 70/225 427/160 |
| 4,883,341 A | * | 11/1989 | Whitehead ............... | G02B 3/08 359/601 |
| 5,225,933 A | * | 7/1993 | Myers .................... | G02B 5/003 359/614 |
| 8,529,075 B2 | * | 9/2013 | Yamada ................. | G02B 1/118 359/614 |
| 8,876,304 B2 | * | 11/2014 | Findlay ............. | H01L 27/14629 359/614 |
| 2005/0058413 A1 | * | 3/2005 | Poulsen ................. | G02B 5/003 385/115 |
| 2006/0227834 A1 | * | 10/2006 | Yoshikawa ............ | G02B 1/118 372/50.11 |
| 2007/0195417 A1 | * | 8/2007 | Yamamoto ........... | H04N 9/3114 359/590 |
| 2007/0247718 A1 | * | 10/2007 | Yoshikawa .............. | G02B 7/02 359/614 |
| 2010/0177398 A1 | * | 7/2010 | Watanabe ......... | G02F 1/133502 359/614 |

(Continued)

*Primary Examiner* — Balram T Parbadia
(74) *Attorney, Agent, or Firm* — Perkins Coie LLP (57) ABSTRACT

Improved optically absorptive surfaces as well as surfaces and structures exhibiting reduced or minimized optical scattering or reflection, including an improved optically black surface that can be used for stray light suppression having macroscopic repetitive features with multiple facets and/or curved faces that direct near specular rays and scattered rays from one feature element to neighboring elements.

22 Claims, 11 Drawing Sheets

(56) References Cited

U.S. PATENT DOCUMENTS

| | | | |
|---|---|---|---|
| 2011/0051251 A1* | 3/2011 | Endoh | G02B 27/0018 |
| | | | 359/614 |
| 2014/0029103 A1* | 1/2014 | Budleski | G02B 5/003 |
| | | | 359/584 |
| 2016/0076718 A1* | 3/2016 | Gardiner | E06B 9/266 |
| | | | 359/596 |
| 2017/0066932 A1* | 3/2017 | Magdassi | C03C 17/32 |
| 2017/0108628 A1* | 4/2017 | Larsen | G02B 1/04 |

* cited by examiner

MACRO-SCALE FEATURES FOR OPTICALLY BLACK SURFACES AND STRAYLIGHT SUPPRESSION

CROSS-REFERENCE TO RELATED APPLICATION(S)

This patent document claims priority to and benefits of U.S. Provisional Patent Application No. 62/677,699 entitled, "MACRO-SCALE FEATURES FOR OPTICALLY BLACK SURFACES AND STRAYLIGHT SUPPRESSION" and filed on May 30, 2018. The entire contents of the before-mentioned patent application are incorporated by reference as part of the disclosure of this patent document.

TECHNICAL FIELD

The subject matter of this patent document relates to optically absorptive surfaces and structures.

BACKGROUND

Suppression of undesired straylight or optical signals is desirable in various optical systems or devices because undesired straylight or optical signals can interfere with processing, propagation or detection of desired light or optical signals.

SUMMARY

The devices and techniques based on the disclosed technology can be used to provide optically absorptive surfaces or surfaces and structures exhibiting reduced or minimized optical scattering or reflection. In some applications, the disclosed devices and techniques can be used to provide an improved optically black surface that can be used for straylight suppression having macroscopic repetitive features with multiple facets and/or curved faces that direct near specular rays and scattered rays from one feature element to neighboring elements.

In one aspect, the disclosed technology can be implemented to construct an optically absorptive structure which includes a base structure having a supporting surface; and a cluster of macro structures located on the supporting surface each including macro-scale surfaces at different surface orientations that are slanted with respect to the supporting surface to redirect light incident towards the supporting surface towards neighboring macro structures to cause redirected light to bounce between macro-scale surfaces of neighboring macro structures, thus reducing scattering or reflection of incident light by the optically absorptive structure. In this structure, each macro-scale surface on the macro structures is structured to be optically absorptive to further reduce scattering or reflection of incident light by the optically absorptive structure.

In another aspect, the disclosed technology can be implemented to construct an optically absorptive structure that includes a base structure having a supporting surface; and a cluster of macro structures located on the supporting surface each including a base taper section engaged to the supporting surface and a top taper section engaged to the base taper section. The base and top taper sections are structured to have an increasingly reduced dimension in a direction away from the supporting surface and having slanted side surfaces to redirect incident fight to neighboring macro structures. The top taper section is structured to terminate at a small tip and each macro-scale surface on the macro structures is structured to be optically absorptive.

Those and other aspects of the disclosed technology and their implementations and examples are described in greater detail in the drawings, the description and the claims.

BRIEF DESCRIPTION OF THE DRAWINGS

FIG. 3B shows a side view and FIG. 3C shows a top view.

DETAILED DESCRIPTION

Optical devices or systems tend to subject to noise or optical interference from undesired stray light, especially in devices or systems having free-space optical paths. Therefore, straylight suppression is desirable in various optical devices or systems and can be implemented with structures that prevent light rays from straying and suppressing those that do. Since no optical system is perfect, there will always be straylight. Optically black surfaces are used in the structures surrounding or supporting optics and sensors to absorb rays that strike them. Unfortunately, materials and coatings used to create optically black surfaces have limitations. The level of absorption of an optically absorptive material or coating tends to vary with the angle that the ray strikes the surface. In addition, the optical absorption of an optically absorptive material or coating tends to vary with the optical wavelength. For example, a good optically black surface at one wavelength band may be a good diffuse reflector at another. Also, absorption will tend to decrease as the angle of the ray to a line perpendicular to the surface increases. Thus, an optically black surface for use in straylight reduction would be highly advantageous.

The optically absorptive structures disclosed in this patent document can be implemented in ways that combine the light absorption by optically absorptive surfaces and the presence of a cluster or array of macro structure elements to reduce optical reflection or scattering by redirecting incident light between the macro structure elements having optically absorptive surfaces. This combination can be used to overcome certain limitations of certain optically absorptive materials or coatings and to improve or enhance the overall reduction of optical scattering or reflection. Suitable macro structure elements include structures with a dimension greater than the optical wavelengths of light to be absorbed and having exterior surfaces that are optically absorptive.

Light in an optical device or system tends to decrease in power each time it strikes a surface that is at least partially absorbing. The designs based on the disclosed technology use a cluster or array of macro structure elements to reduce optical reflection or scattering by redirecting incident light between the macro structure elements having optically absorptive surfaces to increase or maximize the number of surfaces that each ray strikes. In addition, on each surface of the macro structure elements, an optical absorptive material, structure or coating can be implemented to increase the optical absorption. To this end, various optical films or coatings can be used, including microscopic features are deposited on a surface to make the surface complex and many faceted. For example, Carbon Nanotube coatings, such as Vantablack may be used on the exterior surfaces of macro structure elements (http://www.surveynanosystems.com/vantablack/science-of-vantablack).

In some implementation of the disclosed technology, a macroscopic "black" surface can be structured to include irregular or repetitive features called elements, with multiple facets and/or curved faces that direct near specular rays and scattered rays from one feature element to other neighboring elements. Repetitive or irregular elements can be configured to maximize the number of surfaces in each ray path in order to dissipate stray ray energy using faces with nominal absorption.

For example, in some designs, the macro-scale surfaces of this disclosure are comprised of repetitive and adjacent feature elements. Feature elements can be contiguous, and faces on lines joining feature elements have small angles between (<40 deg in the preferred embodiment). Feature elements can include a base shaped to provide for contiguous and continuous coverage of a surface substrate. The base can be a Triangle, Square, Hexagon), Polygon, or Sets of Polygons. Faces of the feature elements may change shape with height or polar angle, transitioning to a cone (such as the Hexacone shape of the preferred embodiment shown the in figures), or into Multiple polygonal cross sections, Multiple peaks or lofts, or Curved loft paths. Surface substrate and feature elements (1) may also have additional treatments to enhance optical absorption such as nano-structures or micro-filaments.

Surfaces comprising feature elements can be fabricated using additive or subtractive techniques such as additive 3D printing, subtractive 3D printing, press or injection molding, material etching, or laser machining or etching. An effective method of making the feature elements of the optically black surface of this disclosure is one in which fabricating the surfaces (or mold masters to replicate the same) requires 3D additive (direct to surface) or 3D subtractive (mold master fabrication for replication) techniques. Conventional machining processes are typically not effective in generating these surfaces.

Figure 1:
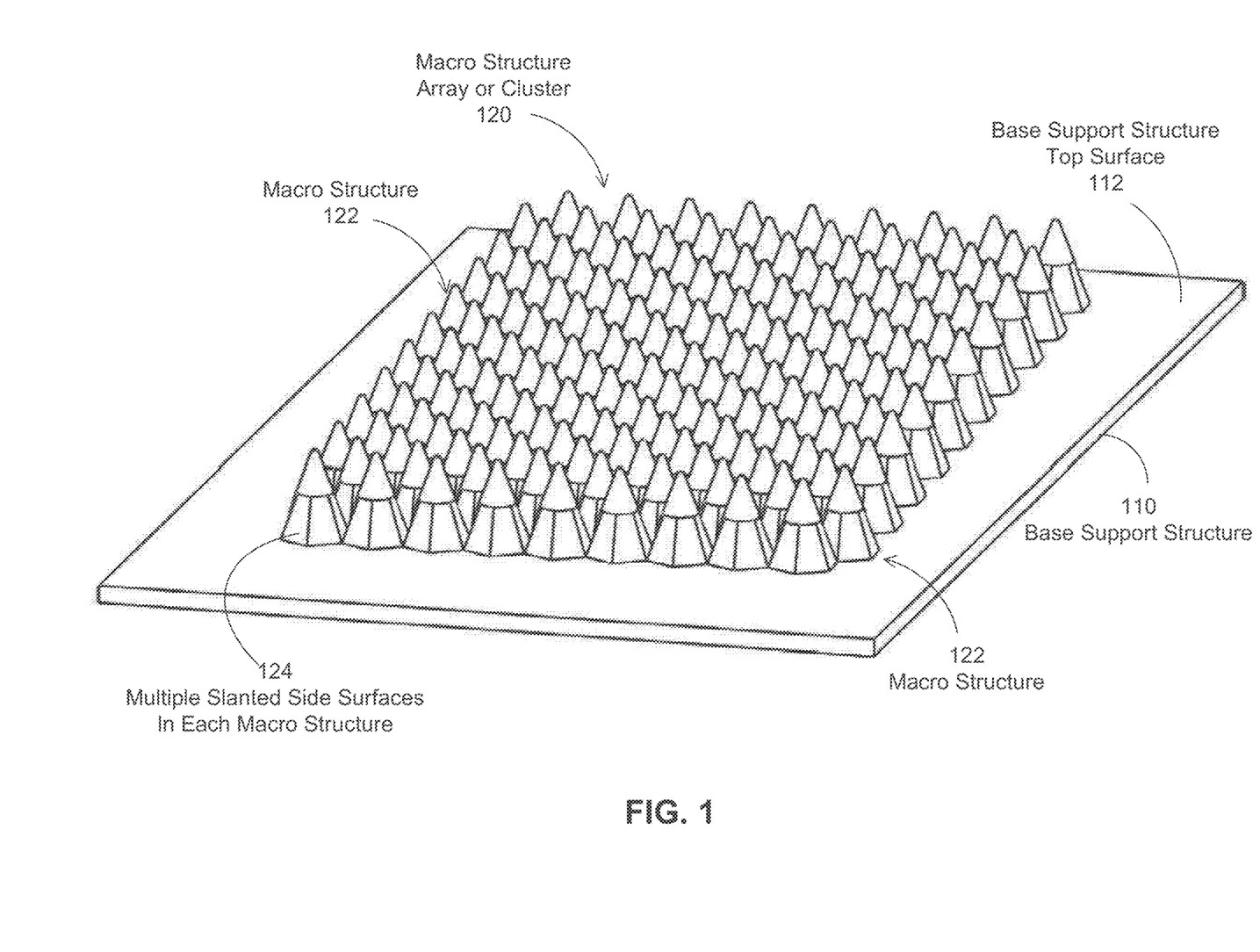
FIG. 1 shows an example of a cluster or array of macro structure elements of an optically absorptive structure that implements the disclosed technology.

FIG. 1 shows an example of a cluster or array of macro structure elements of an optically absorptive structure that implements the disclosed technology. In this example, an optically absorptive structure is illustrated to include a base support structure 110 having a supporting surface 112 on the top and a cluster or array 120 of macro structures 122 is formed or located on the supporting surface 112. This cluster or array 120 can be a periodic array of macro structures 122 or an irregular array of macro structures 122. In addition, macro structures 122 may be identical in some implementations and may vary in size or shape as non-identical elements in other implementations.

Each macro structure 122 includes macro-scale side surfaces 124 at different surface orientations that are slanted with respect to the supporting surface to redirect light incident towards the supporting surface 112 towards neighboring macro structures 122 to cause redirected light to bounce between macro-scale surfaces 124 of neighboring macro structures 122, thus reducing scattering or reflection of incident light by the optically absorptive structure. In this example, each macro-scale surface 124 on the macro structures 122 is structured to be optically absorptive to further reduce scattering or reflection of incident light by the optically absorptive structure. In implementations, the dimensions of tapered structures can be under 1 mm (e.g., around 0.5 mm in some designs). In other implementations, the dimensions of tapered structures can be greater than 1 mm.

Figure 2A:
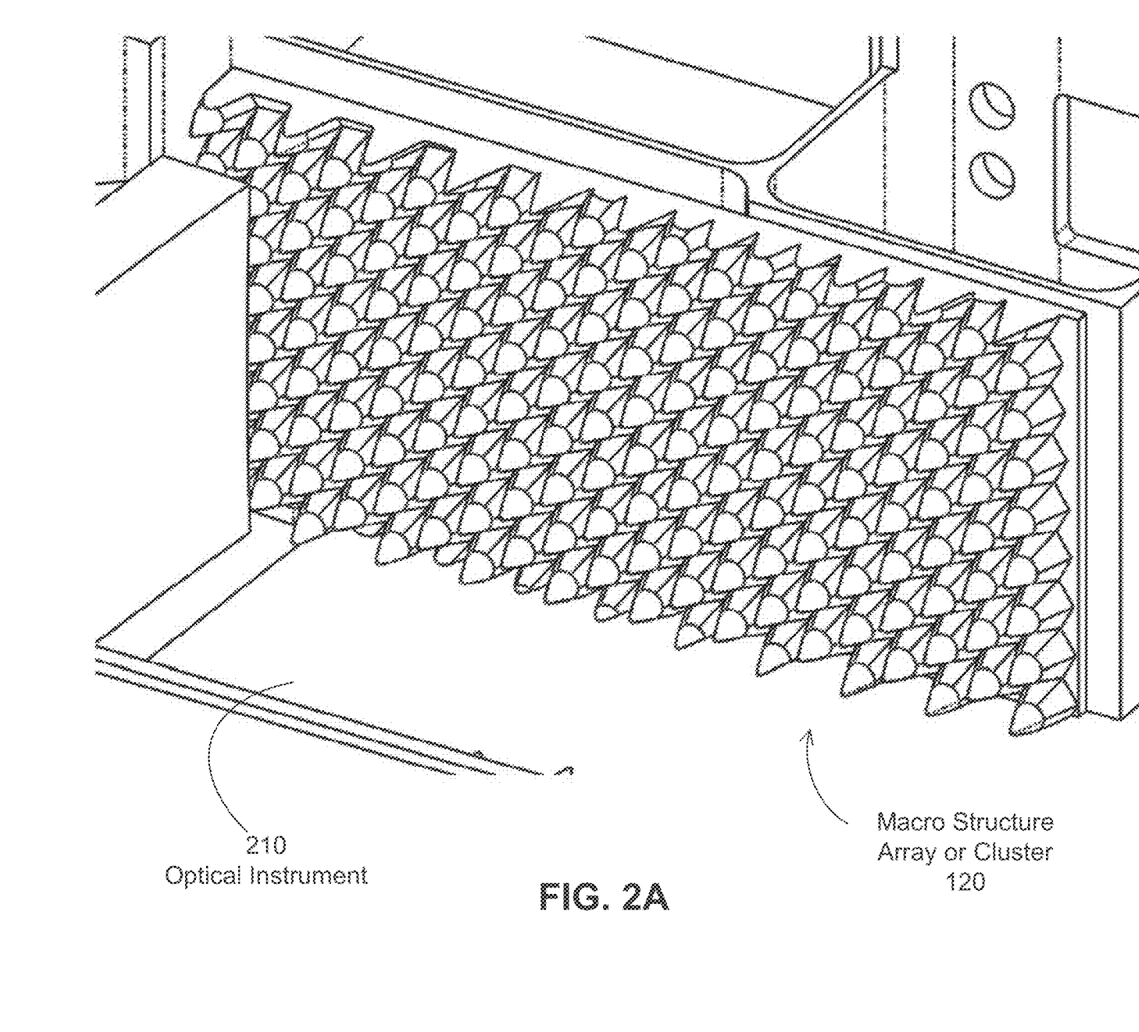
FIGS. 2A and 2B show examples of optical devices that implement one or more optically absorptive structures based on the disclosed technology to suppress undesired straylight.
Figure 2B:
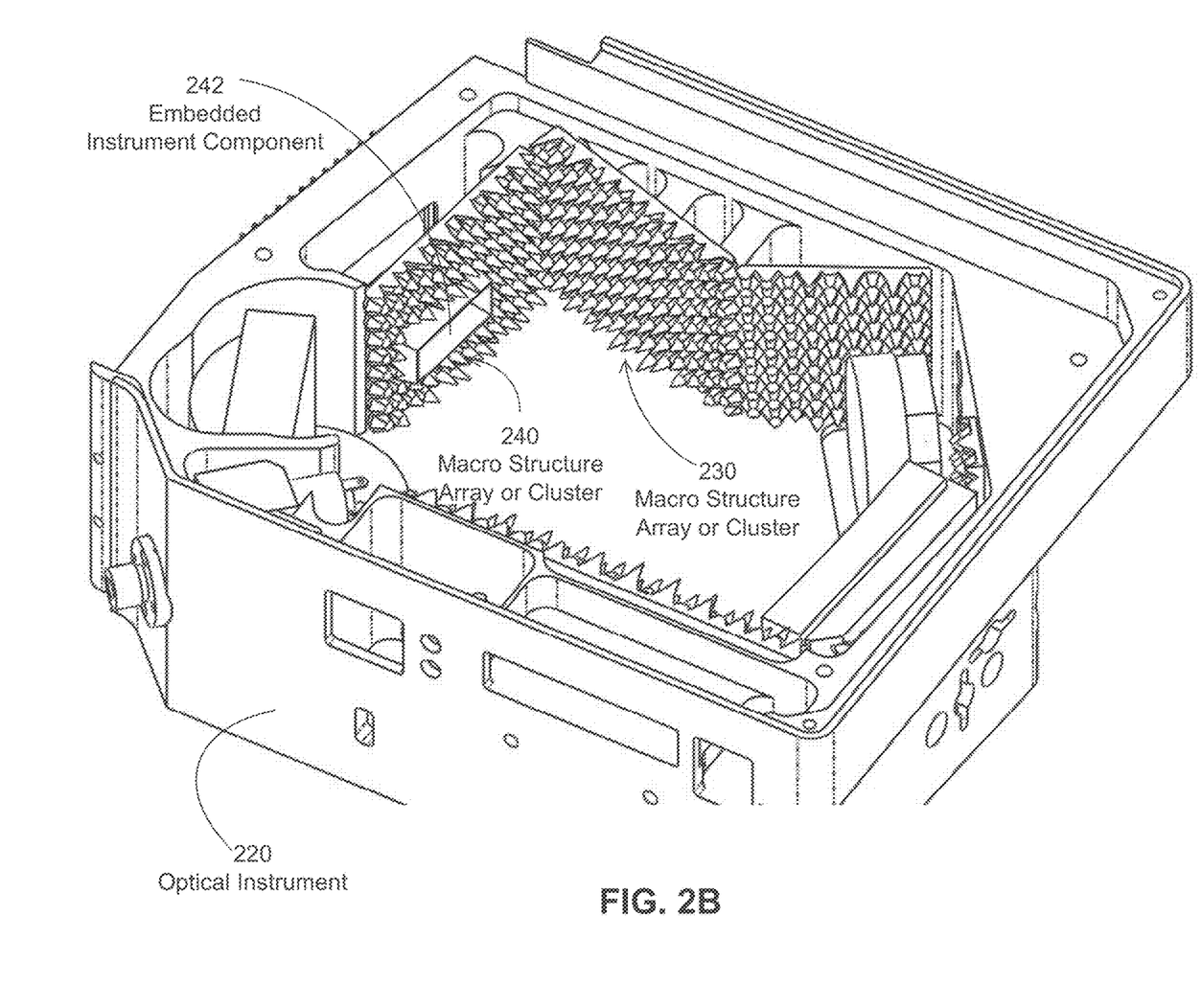

FIGS. 2A and 2B show examples of optical devices that implement one or more optically absorptive structures based on the disclosed technology to suppress undesired straylight. The optical instrument 210 in FIG. 2A may be a spectrometer, for example, in which surfaces along the optical path may be structured to include optically absorptive structures having macro structures 122 shown in FIG. 1. In the optical instrument 220 in FIG. 2B, optically absorptive structures 230 and 240 are implemented where optically absorptive structure 230 is a contiguous surface that is optically absorptive throughout the surface while optically absorptive structure 240 is structured to include a region that embeds an instrument component 242.

Figure 3A:
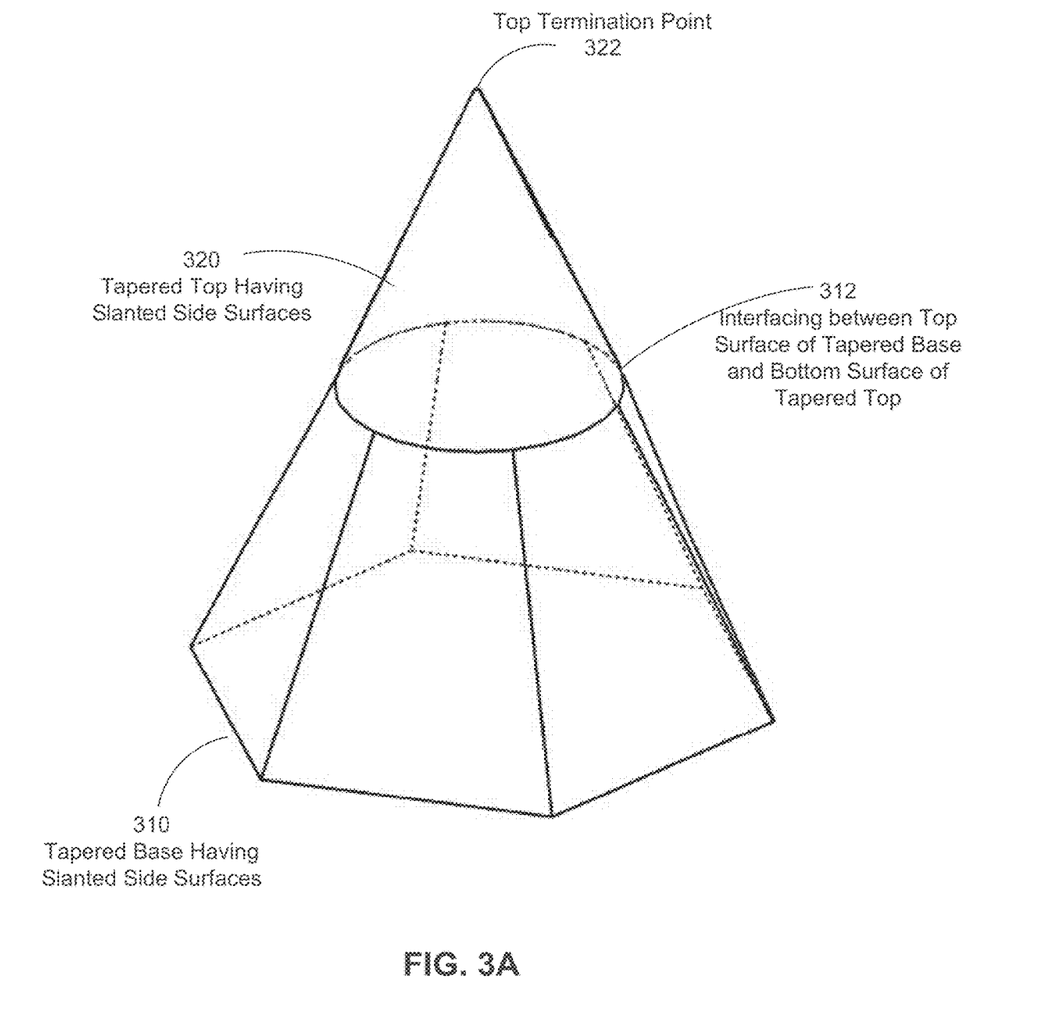
FIG. 3A shows an example of a structure of an individual macro structure element in a cluster or array of macro structure elements of an optically absorptive structure that implements the disclosed technology have two stacked tapered sections.

FIG. 3A shows an example of a structure of an individual macro structure element in a cluster or array of macro structure elements of an optically absorptive structure that implements the disclosed technology to have two stacked tapered sections 310 and 320. The base tapered section 310 is engaged to the supporting surface 112 of the underlying base support 110 shown in FIG. 1. The top tapered section 320 is engaged to the top surface 312 of the base tapered section 310. The base and top tapered sections 310 and 320 are structured to have an increasingly reduced dimension in a direction away from the supporting surface 112 and having slanted side surfaces to redirect incident light to neighboring macro structures. The top tapered section 320 can be structured to terminate at a small terminal tip to reduce any undesired reflection or scattering of the incident light. Each macro-scale surface on the macro structure 310 or 320 is structured to be optically absorptive by including a treated surface (e.g., anodized surface) or a coating such as a black paint or a nanotube coating.

Figure 3B:
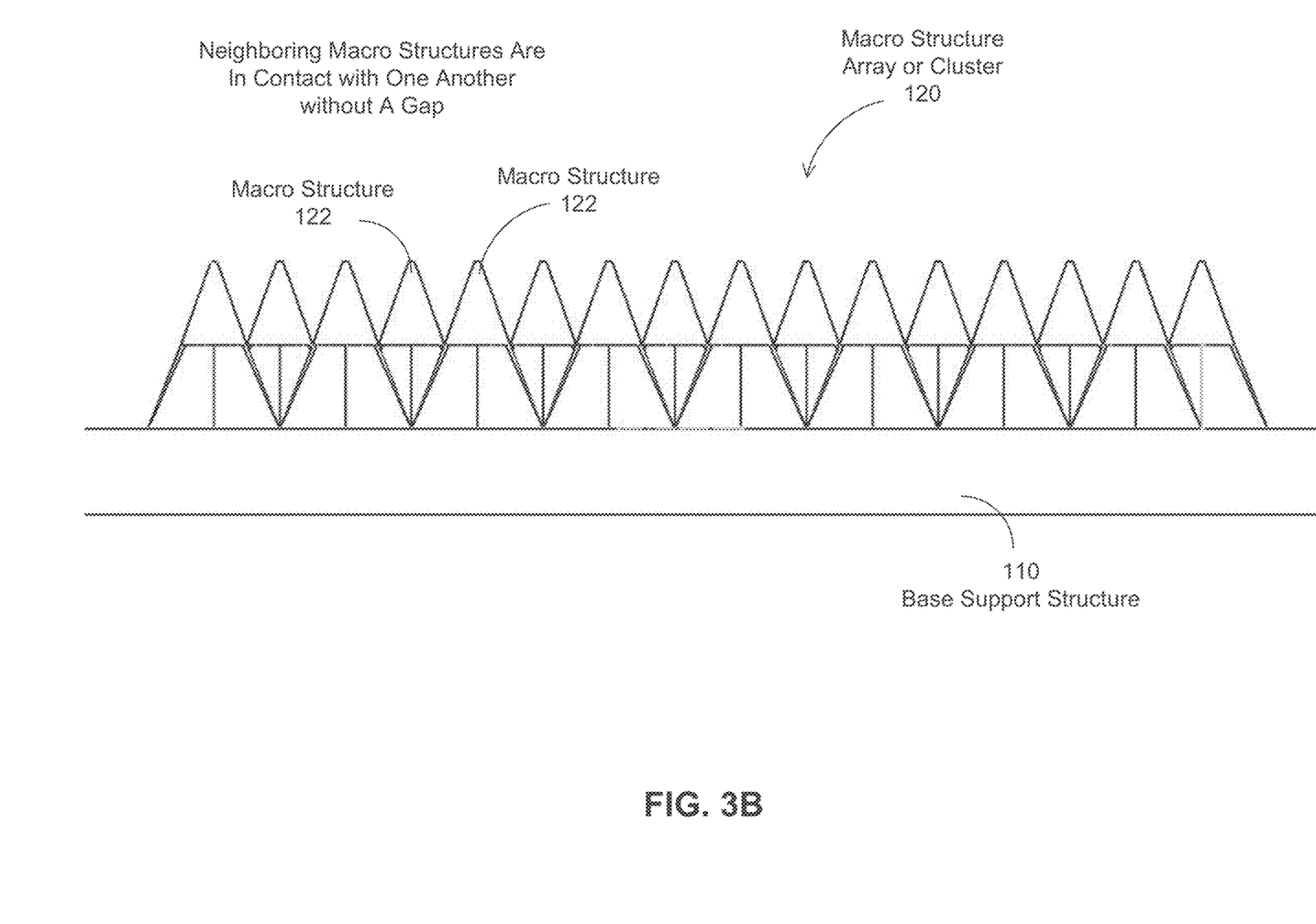
FIGS. 3B and 3C show an example for arranging the macro structure elements as shown in FIG. 3A in a cluster or array of macro structure elements without gaps between neighboring structures to improve the performance of the optically absorptive structure, where
Figure 3C:
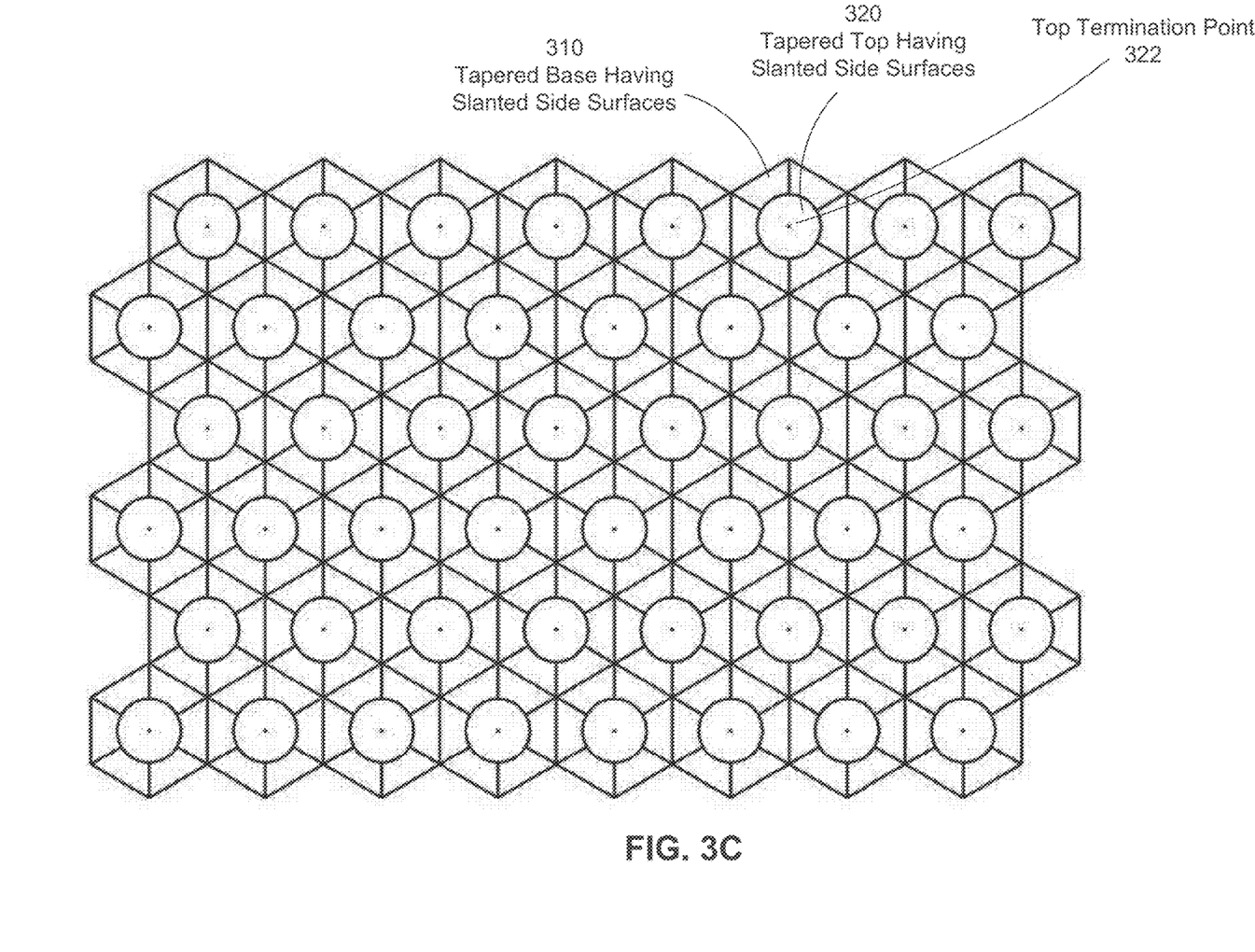

FIGS. 3B and 3C show an example for arranging the macro structure elements as shown in FIG. 3A in a cluster or array of macro structure elements without gaps between neighboring structures to improve the performance of the optically absorptive structure, where FIG. 3B shows a side view and FIG. 3C shows a top view. In the illustrated example, the base tapered section 310 has a hexagon shape with 6 side slanted surfaces to interface with 6 neighboring elements. Other polygon shapes with 3 or more sides, such as triangles, rectangles, squares, and other may be used. The top tapered section 320 in this example is conic shaped to provide a point terminal end and other shapes may also be used for the top tapered section 320.

The example in FIGS. 3B and 3C show a use of identical macro structure elements in an optically absorptive structure. Non-identical macro structure elements may also be used.

Figure 4A:
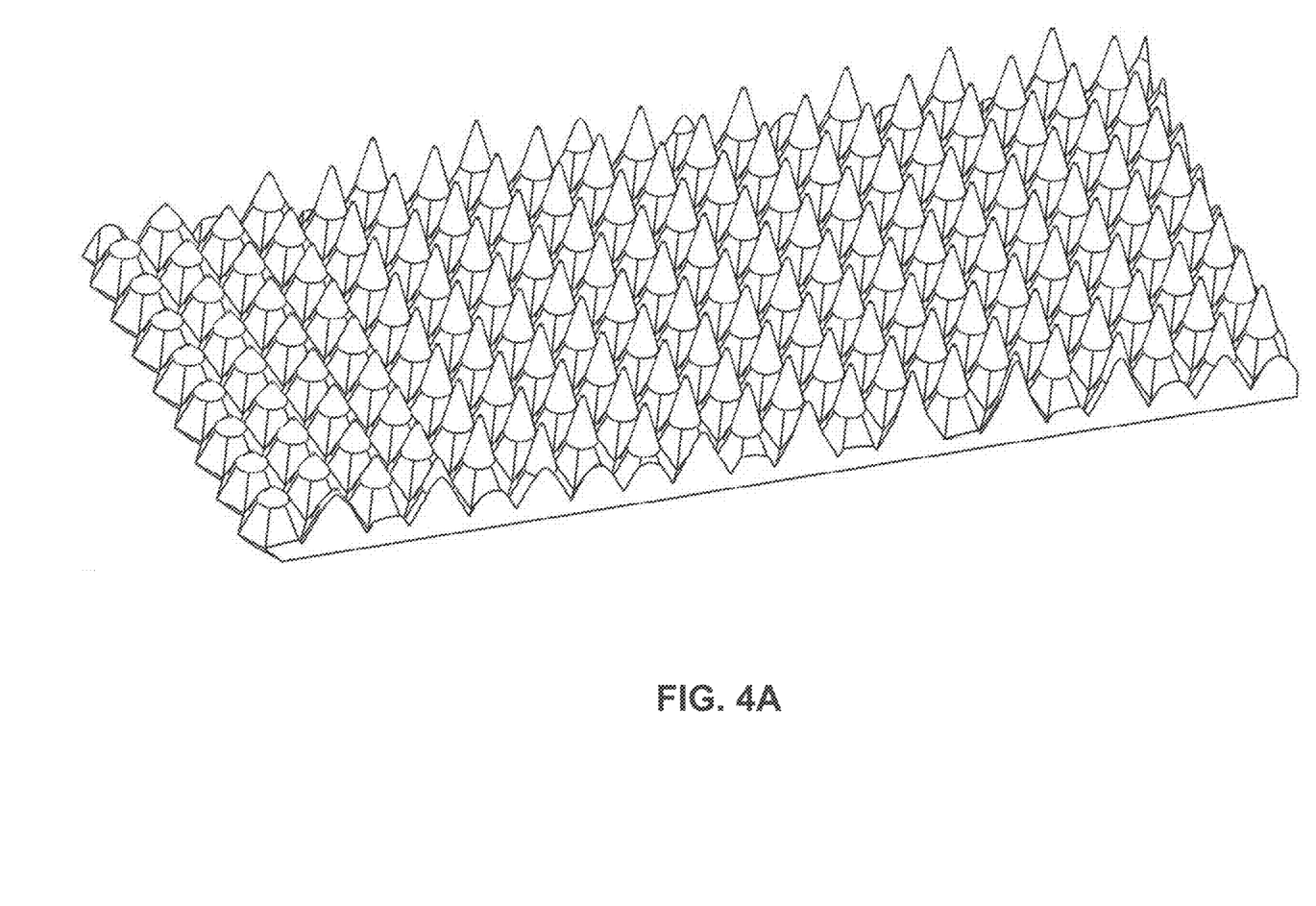
FIGS. 4A and 4B show examples of a cluster or array of non-identical macro structure elements of an optically absorptive structure that implements the disclosed technology.
Figure 4B:
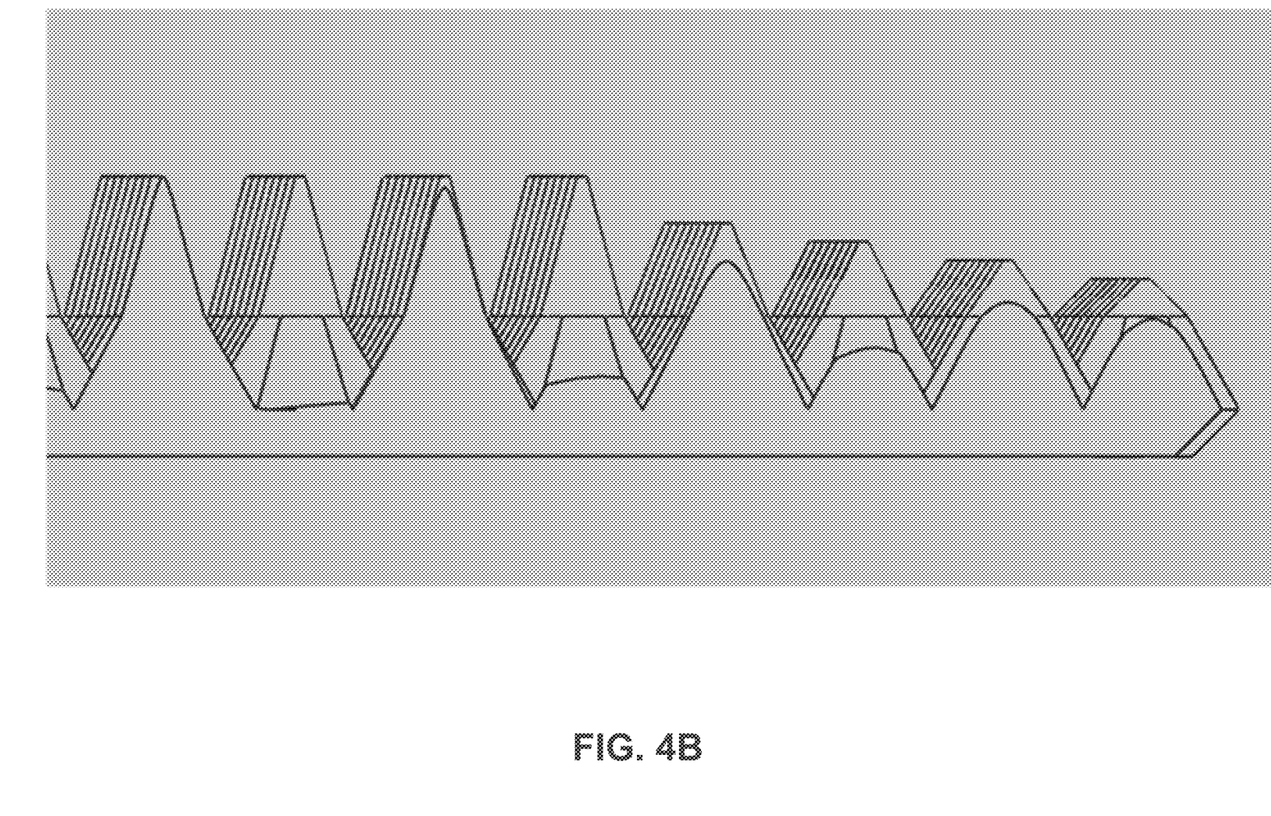

FIGS. 4A and 4B show examples of a cluster or array of non-identical macro structure elements of an optically absorptive structure wherein the top tapered sections 320 may vary in size (FIGS. 4A and 4B) or the base tapered sections 310 may vary in size.

Figure 5:
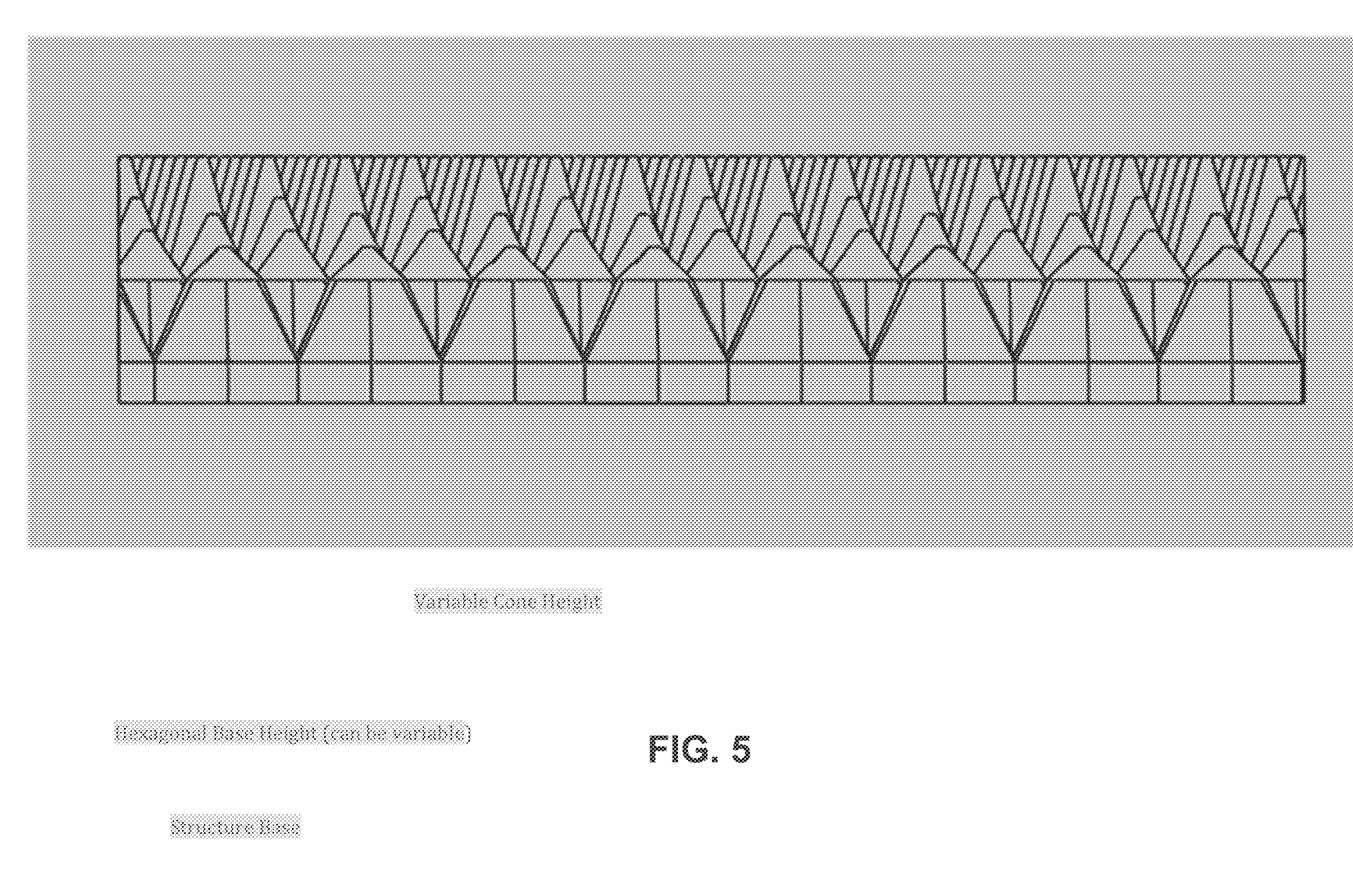
FIG. 5 shows another example of a cluster or array of non-identical macro structure elements of an optically absorptive structure that implements the disclosed technology.

FIG. 5 shows another example of a cluster or array of non-identical macro structure elements of an optically absorptive structure that implements the disclosed technology.

In some implementations, each macro structure element of an optically absorptive structure may be structured to have a single tapered section without the two section designs shown above.

Figure 6A:
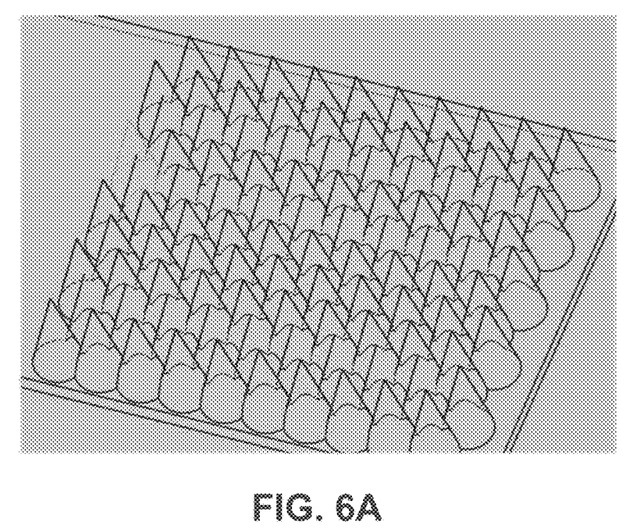
FIGS. 6A, 6B and 6C show an example of a cluster or array of identical macro structure elements of an optically absorptive structure that implements single tapered conic structures based on the disclosed technology.
Figure 6B:
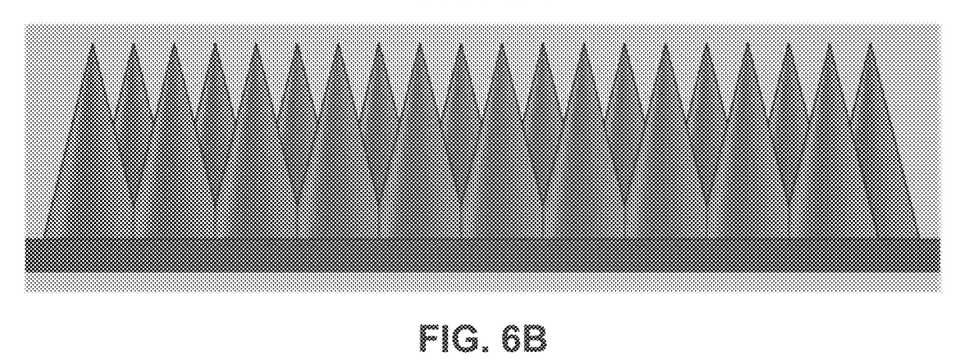
Figure 6C:
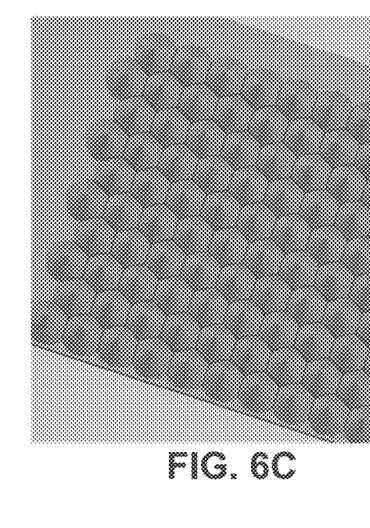

FIGS. 6A, 6B and 6C show an example of a cluster or array of identical macro structure elements of an optically absorptive structure that implements single tapered conic structures based on the disclosed technology. Such tapered conic structures are positioned in direct contact with one another to fully cover the underlying supporting surface so that incident light always hits on a slanted conic surface, thus being redirected to a neighboring tapered conic structure without being reflected back or scattered. FIG. 6A shows a perspective view of this example, FIG. 6B shows a side view along a direction parallel to the underlying supporting surface, and FIG. 6C shows a top view showing the curved borders between adjacent tapered conic structures.

Figure 7:
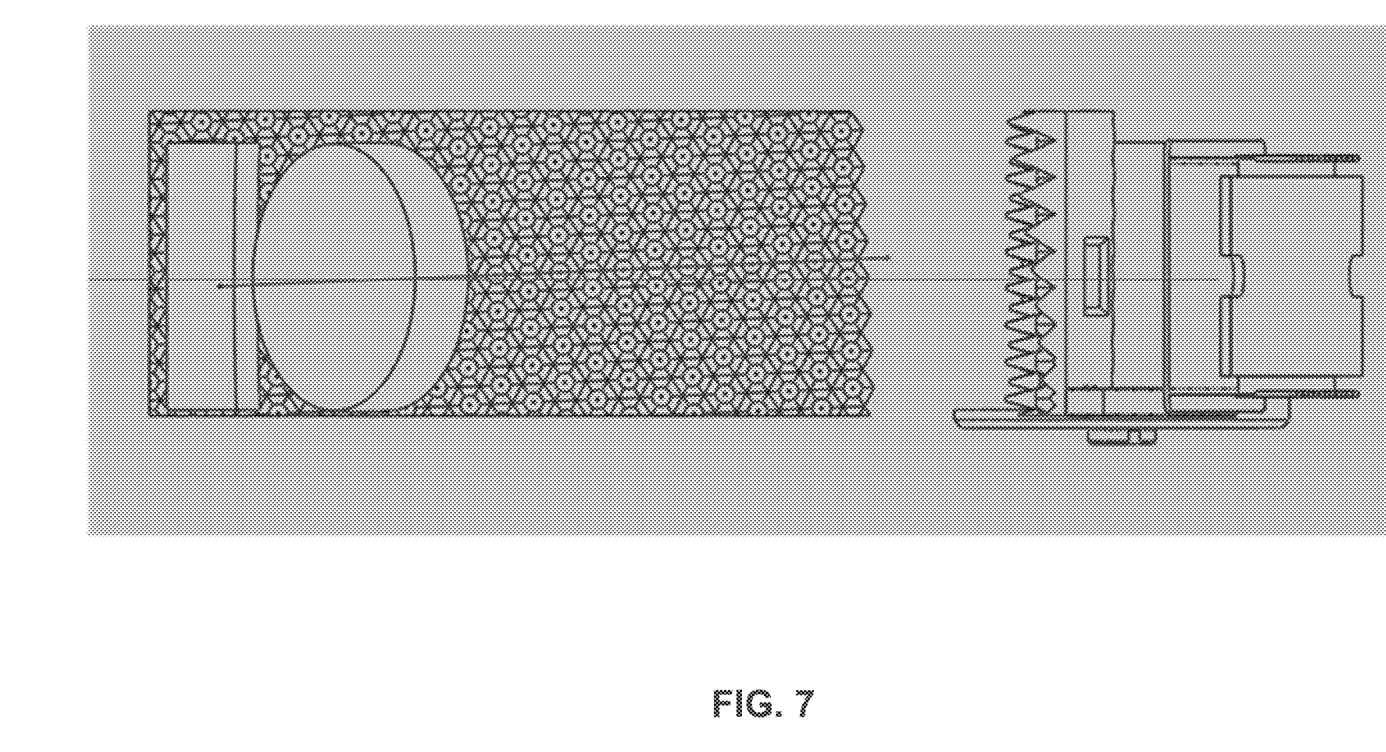
FIG. 7 shows an example of orienting the cluster or array of macro structure elements of an optically absorptive structure so that all macro structure elements along the optic axis of light propagation in an optical device are visible to the light.

FIG. 7 further shows one example for using an optically absorptive structure with a cluster or array of macro structure elements based on the disclosed technology wherein the optically absorptive structure can be positioned with an angular offset with respect to the optic axis of an optical path in an optical device so that that all macro structure elements along the optic axis of light propagation in an optical device are visible to the light.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optically absorptive structure, comprising:
   a base structure having a supporting surface;
   a cluster of macro structures located on the supporting surface each including macro-scale surfaces at different surface orientations that are slanted with respect to the supporting surface to redirect light incident towards the supporting surface towards neighboring macro structures to cause redirected light to bounce between macro-scale surfaces of neighboring macro structures, thus reducing scattering or reflection of incident light by the optically absorptive structure,
   wherein each macro structure includes:
      a first section including a tapered structure shaped in a polygon shape, the tapered structure comprising a larger dimension base having the polygon shape and engaged to the supporting surface and a tapered portion extending from the larger dimension base with an increasingly reduced dimension in a direction away from the supporting surface, wherein the first section has macro-scale surfaces on all sides of the first section that extend away from the supporting surface; and
      a tapered second section shaped in a conical shape, wherein a larger dimension base of the second section has an elliptic shape and is engaged to a top of the first section, the second section extends from the larger dimension base of the second section with an increasingly reduced dimension in a direction away from the supporting surface, and macro-scale surfaces of the second section form a contiguous conical surface of the conical shape, and
   wherein each macro-scale surface on the macro structures is structured to be optically absorptive to further reduce scattering or reflection of incident light by the optically absorptive structure.

2. The optically absorptive structure as in claim 1, wherein:
   the cluster of macro structures is structured so that neighboring macro structures are arranged in contact with one another without leaving a gap therebetween to maximize absorption and redirection of incident light by the macro-scale surfaces of the cluster of macro structures.

3. The optically absorptive structure as in claim 1, wherein:
   in each macro structure, the polygon shape includes a hexagon.

4. The optically absorptive structure as in claim 1, wherein:
   in each macro structure, the first section includes three or more macro-scale surfaces.

5. The optically absorptive structure as in claim 1, wherein:
   each macro structure is coated with an optically absorptive coating.

6. The optically absorptive structure as in claim 5, wherein:
   the optically absorptive coating includes a black paint.

7. The optically absorptive structure as in claim 5, wherein:
the optically absorptive coating includes a carbon nanotube coating.

8. The optically absorptive structure as in claim 5, wherein:
the optically absorptive coating is formed by a treatment of each exposed surface of each macro structure.

9. The optically absorptive structure as in claim 1, wherein:
the macrostructures in the cluster of macro structures are identical in shape or size.

10. The optically absorptive structure as in claim 1, wherein:
the macrostructures in the cluster of macro structures are not identical in shape or size.

11. The optically absorptive structure as in claim 1, wherein:
the macrostructures in the cluster of macro structures have varying heights measured from the supporting surface of the base structure.

12. The optically absorptive structure as in claim 1, wherein:
the macrostructures in the cluster of macro structures have a dimension around below 1 mm.

13. The optically absorptive structure as in claim 1, wherein:
the macrostructures in the cluster of macro structures have a dimension greater than 1 mm.

14. An optically absorptive structure, comprising:
a base structure having a supporting surface;
a cluster of macro structures located on the supporting surface each including a base taper section engaged to the supporting surface and a top taper section engaged to the base taper section, the base and top taper sections structured to have an increasingly reduced dimension in a direction away from the supporting surface and having slanted side surfaces to redirect incident light to neighboring macro structures, wherein the top taper section is structured to terminate at a small tip,
wherein the base taper section is shaped in a polygon shape, a larger dimension base of the base taper section is engaged to the supporting surface and has the polygon shape,
wherein the top taper section is shaped in a conical shape, a larger dimension base of the top taper section is engaged to a top surface of the base taper section, the larger dimension base of the top taper section has an elliptic shape, and side surfaces of the top taper section form a contiguous conical surface of the conical shape, and
wherein each side surface on the macro structures is structured to be optically absorptive.

15. The optically absorptive structure as in claim 14, wherein:
the cluster of macro structures is structured so that neighboring macro structures are arranged in contact with one another without leaving a gap therebetween to maximize absorption and redirection of incident light by the macro-scale surfaces of the cluster of macro structures.

16. The optically absorptive structure as in claim 14, wherein:
each macro structure is coated with an optically absorptive coating.

17. The optically absorptive structure as in claim 16, wherein:
the optically absorptive coating includes a carbon nanotube coating.

18. The optically absorptive structure as in claim 14, wherein:
the macrostructures in the cluster of macro structures are identical in shape or size.

19. The optically absorptive structure as in claim 14, wherein:
the macrostructures in the cluster of macro structures are not identical in shape or size.

20. The optically absorptive structure as in claim 14, wherein:
the macrostructures in the cluster of macro structures have varying heights measured from the supporting surface of the base structure.

21. The optically absorptive structure as in claim 14, wherein:
the macrostructures in the cluster of macro structures have a dimension around below 1 mm.

22. The optically absorptive structure as in claim 14, wherein:
the macrostructures in the cluster of macro structures have a dimension greater than 1 mm.

* * * * *